United States Patent
Ferguson et al.

(10) Patent No.: US 8,839,621 B2
(45) Date of Patent: Sep. 23, 2014

(54) HYBRID POWER PLANT

(75) Inventors: Roger Ferguson, Des Moines, IA (US); Kenneth Bryden, Ames, IA (US); Steve Corns, Rolla, MO (US)

(73) Assignee: Hybrid Power LLC, Des Moines, IA (US)

(*) Notice: Subject to any disclaimer, the term of this patent is extended or adjusted under 35 U.S.C. 154(b) by 0 days.

(21) Appl. No.: 12/861,342

(22) Filed: Aug. 23, 2010

(65) Prior Publication Data
US 2011/0302921 A1    Dec. 15, 2011

Related U.S. Application Data

(60) Provisional application No. 61/236,009, filed on Aug. 23, 2009.

(51) Int. Cl.
| F01K 7/32 | (2006.01) |
| F01K 7/34 | (2006.01) |
| F01K 23/06 | (2006.01) |
| F01K 27/00 | (2006.01) |
| F03G 7/00 | (2006.01) |
| F03G 6/00 | (2006.01) |

(52) U.S. Cl.
USPC ............... 60/647; 60/653; 60/670; 60/641.8; 60/641.1

(58) Field of Classification Search
USPC .......... 60/641.1, 641.2, 641.5, 641.8, 641.11, 60/641.15, 644.1–681, 655
See application file for complete search history.

(56) References Cited

U.S. PATENT DOCUMENTS

| 3,575,002 | A |   | 4/1971 | Vuia |
| 3,950,949 | A |   | 4/1976 | Martin et al. |
| 4,031,706 | A |   | 6/1977 | Vakil et al. |
| 4,530,814 | A |   | 7/1985 | Schluderberg et al. |
| 5,111,662 | A | * | 5/1992 | Nicolin et al. ................. 60/655 |
| 5,311,741 | A | * | 5/1994 | Blaize ............................ 60/676 |
| 5,361,377 | A |   | 11/1994 | Miller et al. |
| 5,727,379 | A | * | 3/1998 | Cohn ........................ 60/39.182 |
| 5,793,831 | A |   | 8/1998 | Tsiklauri et al. |
| 6,164,072 | A |   | 12/2000 | Tsiklauri et al. |

(Continued)

FOREIGN PATENT DOCUMENTS

| EP | 0129167 | 12/1984 |
| GB | 2431968 | 5/2007 |
| WO | 2007104080 A1 | 9/2007 |

OTHER PUBLICATIONS

Cherry, Robert S. & Wood, Richard A. (2006). Use of Nuclear High Temperature Gas Reactor in a Coal-to-Liquids Process, Idaho National Laboratory, INL/EXT-06-11667.

(Continued)

*Primary Examiner* — Kenneth Bomberg
*Assistant Examiner* — Christopher Jetton
(74) *Attorney, Agent, or Firm* — Davis, Brown, Koehn, Shors & Roberts, P.C.; Kent A. Herink

(57) ABSTRACT

A hybrid power plant is described in which a pressurized water nuclear reactor or a biomass-fueled power plant, which have a relatively low operating temperature, such as, is combined with a coal or other fossil fuel power plant having a higher operating temperature. Steam from the first plant is superheated in the second power plant to provide a hybrid plant with improved efficiencies and lower emissions.

4 Claims, 9 Drawing Sheets

(56) References Cited

U.S. PATENT DOCUMENTS

| | | |
|---|---|---|
| 6,244,033 B1 | 6/2001 | Wylie |
| 6,497,102 B2 | 12/2002 | Liebig |
| 6,742,336 B2 | 6/2004 | Itou et al. |
| 6,966,190 B2 | 11/2005 | Wylie |
| 2006/0137349 A1 | 6/2006 | Pflanz |
| 2006/0266039 A1 | 11/2006 | Skowronski et al. |
| 2007/0012041 A1 | 1/2007 | Goldman |
| 2007/0217995 A1 | 9/2007 | Matsumura et al. |
| 2007/0280400 A1 | 12/2007 | Keller |
| 2008/0127647 A1* | 6/2008 | Leitner .................... 60/645 |

OTHER PUBLICATIONS

Dunbar, William R., Moody, Scott D. & Lior, Noam (1995). Exergy Analysis of an Operating Boiling-Water-Reactor Nuclear Power Station, Energy Convers. Mgmt. vol. 36, No. 3, pp. 149-159.

Lior, Noam (1997). Energy, Exergy and Thermoeconomic Analysis of the Effects of Fossil-Fuel Superheating in Nuclear Power Plants, Energy Convers. Mgmt. vol. 38, No. 15-17, pp. 1585-1593.

Brian Ricketts et al., "Technology Status Review of Waste/Biomass Co-Gasification with Coal", Apr. 8, 2002.

* cited by examiner

| Economic Model |||||
|---|---|---|---|---|
| Stand Alone - Current Designs |||||
| Plant | Capacity (MW) | Cost/KWH | Annual output (MWH) | Annual Cost (Million) |
| Nuclear #1 | 1,190 | $0.05 | 10,424,400,000 | $521 |
| Nuclear #2 | 1,190 | $0.05 | 10,424,400,000 | $521 |
| Coal Fired | 1,075 | $0.05 | 9,417,000,000 | $471 |
| Total | 3,455 | $0.05 | 30,265,800,000 | $1,513 |
| Hybrid Power Center |||||
| Plant | Capacity | Cost/KWH | Annual output (MWH) | Annual Cost (Million) |
| Nuclear #1 | 1,190 | $0.05 | 25,974,268,992 | $521 |
| Nuclear #2 | 1,190 | $0.05 | 25,974,268,992 | $521 |
| Coal Fired | 90.3% nuclear input | | | $471 |
| Total | 5,930 | | 51,948,537,984 | $1,513 |
| | | | Cost of Extra Turbine/Generators (10%) | $151 |
| | | | Total Cost | $1,664 |

| | Emissions/ MWH | Spent Fuel/MWH | Cost/KWH |
|---|---|---|---|
| Standalone Coal | 100% | NA | 0.05 |
| Standalone Nuclear | NA | 100% | 0.05 |
| Hybrid | 25.33% | 40.13% | 0.032 |
| Reduction % | 74.66% | 47.54% | 35.91% |

| Operating Statistics for Economic Model ||||
|---|---|---|---|
| Operating Parameters ||||
| | Nuclear | Coal | Hybrid |
| Condensate in ºF | 122 | 122 | 122 |
| Feedwater in ºF | 208 | 408 | 408 |
| Steam Output | 575 | 1200 | 1200 |
| Energy Inputs - BTU/Pound ||||
| Condensate | 107.7 | 107.7 | 107.7 |
| Feedwater in | 176 | 384 | 384 |
| Steam Output | 1306.6 | 1619.7 | 1619.7 |
| Usable Energy | 185.6 | 498.7 | 498.7 |
| Reactor Addition | 1130.6 | NA | 922.6 |
| Coal Addition | NA | 1235.7 | 313.1 |

FIG. 5

HYBRID POWER PLANT

This application claims priority to U.S. Patent Application Ser. No. 61/236,099, filed Aug. 23, 2009.

BACKGROUND OF THE INVENTION

The present invention relates generally to nuclear power plants and, more specifically, to a hybrid power plant combining a nuclear power plant or a biomass fired power plant with a fossil fuel fired power plant to provide improved efficiencies and reduced emissions.

The vast majority of energy production in the world comes from one of four non-renewable sources: coal, gas, petroleum or nuclear. According to the most recent data (CY 2006) from the International Energy Agency, 85% of electricity was generated from nuclear (23.2%) and combustibles (61.8%), while hydroelectric was 13.4% and other renewables was 1.6%. Each of these sources has its strengths and weaknesses. US only data from the US Department of Energy breaks down combustibles as coal 49.7%, natural gas 18.7% and petroleum 3%. Petroleum is almost always reserved for transportation and is not normally used in electrical power generation. Natural gas is used, but because of its cost is normally only used to power peak period surge capacity. This leaves nuclear and coal fired plants to provide base load and the majority of electricity in the world.

Coal currently provides the vast majority of base load electrical generating capacity and about half of all capacity, but its use is coming under heavy attack for pollution concerns and especially the "greenhouse gas" emissions of carbon dioxide. Nuclear's use has been limited by it high costs of production, largely driven by the very low thermal efficiency of its steam cycle that requires a very large reactor relative to the amount of electricity that can be generated by its low temperature saturated steam. Biomass has been investigated, but because of the high water content and low energy density it is not possible to achieve combustions temperatures comparable to coal combustion. This results in lower efficiencies from low temperature saturated steam, much like those that limit nuclear power.

Current applications for addressing environmental and efficiency issues center around multiple use facilities. These facilities use a single source of energy to satisfy several needs, many by exploiting synergies between emissions control and unused waste energy or combustion products. This patent proposes a more effective approach to the multiple use facility by using more than one energy source in a hybrid power plant to use the strengths of the separate technologies to address the accompanying weaknesses. A hybrid plant combining the existing technologies of nuclear power plants or biomass power plants interconnected to a modified coal plant would result in a total thermal process that would have a greatly improved thermal cycle, thereby increasing electrical output to nearly double from the same sets of inputs compared to 'stand-alone' configurations, thereby dramatically lowering cost, pollution and carbon dioxide emissions relative to two stand alone plants of these designs.

Coal-fired fossil fuel plants generally operate at the highest levels of thermal efficiency, with electricity output to heat unit input fractions in the 30-45% range. This is accomplished through a three-step steam cycle. First, the feedwater to the boiler is pre-heated with the low temperature effluent combustion gasses extraction steam to increase the temperature from condenser temperature to approximately 450-500° F. Once the feed water is added to the boiler, it is heated and converted to saturated steam at temperatures of 500-600° F. Once the steam is formed in the boiler, it passes through superheat tubes in the hottest section of the effluent gas column where the steam is increased in temperature to 1100° F.-1200° F. This superheated steam is then passed through a series of high, intermediate and low pressure turbines where energy is extracted and electricity is produced by generators mechanically attached to the turbines. A final step in a coal-fired plant process for electricity generation is that the air being drawn into the firebox is passed through the lowest temperature effluent gasses to pre-heat the incoming air and increase the temperature of combustion.

A coal-fired plant is very efficient, but even in this type of plant most of the energy of combustion is lost. Of the 1512 BTUs required to heat a pound of ambient 140° F. (60° C.) feedwater to a pound of superheated steam at 1200° F. (650° C.), 1000 psi steam, 1014 BTUs or 67% of the input energy goes to converting the water to steam and cannot be recovered as electrical output. Approximately another 40 BTUs (about 3% of the total) are also un-recoverably lost in each cycle. The condensers downstream of turbines will operate at a vacuum, so that the steam will not reconvert to water at the normal 212° F. (100° C.) boiling point, but at a temperature of 140° F. (60° C.). However, this water will continue to cool to the temperature of the river or lake being used as the heat sink, and this heat will have to be replaced in the next cycle. Usable (available for conversion to electricity) energy can be extracted from the steam from 1200° F. (650° C.) to steam at 140° F. (60° C.). This means that less than one of every two tons of carbon dioxide that a coal powered plant emits to the atmosphere is ever used to produce electricity.

The use of biomass in place of coal in a boiler requires a configuration much like that of a pulverized coal boiler, although the operation of the plant is altered. While there is a 'net zero' carbon emission from these facilities, biomass has a lower energy density and flame temperature than coal when combusted under the same conditions. This reduces the amount of energy that can be imparted to the feed water, reducing the steam temperature to usually no more than 850° F. steam. Because of the lower operating temperature a lower operating pressure is used to increase cycle efficiency, so an operating pressure of 850 psi is assumed. This is a heat addition of 1317 BTUs per pound to ambient feedwater, of which about 1014 BTUs are lost due to the phase change from steam to water and other losses. This results in 77% of the energy not being available to produce electricity.

The current state of the art nuclear power plants (including pressurized light water reactors, boiling water reactors, and heavy water CANDU designs) are extremely stable, safe, and emission free. Their power output is extremely restricted, however, by the need to limit the maximum temperature in the reactor core to approximately 600° F. (boiling water reactors operate at lower core temperatures of about 540-550° F.) to prevent loss of coolant and damage to the fuel elements. This results in a vastly oversized reactor plant and the wasting of a high percentage of the BTUs generated. This results in excessive thermal pollution—the localized heating of the bodies of water that serve as heat sinks for the condensers of the steam turbine units.

The nuclear power plant has only two of the three steps of the steam cycle. Essentially no superheat is added to the steam cycle as the water in the steam generator is already in contact with the hottest water to pass through the reactor. Methods exist to preheat the feedwater entering the steam generator, but this is done solely with extraction steam, requiring a higher steam flow rate for the same electrical output. The primary coolant water in contact with the reactor core heats to 600° F. before moving to the steam generator (the same function as the boiler in the coal-fired plant) and converting secondary water to steam at about 575° F. with an operating pressure of 400 psi to increase efficiency. This results in a steam cycle where only 1199 BTUs can be added to each pound of steam, yet the same 1014 BTUs are lost in changing the water to/from steam, so that fully 85% of the heat energy input can never be used in the creation of electrical energy. By combining the higher temperatures achievable in a coal furnace with the low temperature steam from a nuclear or biomass plant, a higher efficiency can be realized with fewer emissions compared to either design alone.

A search of prior art was conducted and the following related patents were discovered. None of these patents teach or suggest any method or device matching this invention.

U.S. Pat. No. 3,575,002 by Vuia was for a design that routed the saturated steam from a standard nuclear power plant through the superheater section of a fossil fuel furnace in a conventional power plant. While a feasible solution, a majority of the energy input to the system is from coal, as this is a full scale fossil fuel power plant with a slightly larger superheater section in the furnace. This design by Vuia proposes a design with two independent power plants in which the nuclear is assisted by the coal plant. In contrast this invention proposes a single integrated hybrid power plant that uses the energy from the coal only to add superheat to the steam, decreasing the amount of coal used to generate the same amount of energy.

U.S. Pat. No. 4,530,814 to Schluderberg uses the thermal energy from a fossil fired plant to produce steam. This steam is then routed through a moisture separator/reheater unit to add superheat to steam that has already been expanded through a high pressure turbine. This design uses the fossil fuel exclusively to add superheat to the nuclear process steam, but does so indirectly and only after the steam pressure has been lowered. In this design the power plant steam flows again remain separate and the coal plant only provides a reheat assist to the nuclear power plant, no energy is made available to preheat feedwater.

U.S. Pat. No. 5,361,377 to Miller describes the use of superheaters before the high pressure turbine and in the moisture separator/reheater section between turbines. The superheater described may receive energy either from fossil fuel combustion or steam from an adjacent fossil fuel plant. The description is unclear on how the superheater would be able to use either steam or fossil fuel. The design also fails to make full use of the exhausted flue gases to preheat feed water and combustion air, indicating that it is a small burner unit and not a full size coal burning furnace. This design appears to only pertain to an externally heated superheater on a nuclear power plant.

U.S. Pat. No. 5,457,721 to Tsiklauri uses a combined cycle system with the hot exhaust gases from a natural gas fired gas turbine unit heating feedwater and producing steam. The steam from this heat recovery steam generator is then used to superheat the steam from a nuclear powered steam generator. After the steam is expanded in the high pressure turbine, the two fluid streams are mixed and augmented by more steam from the heat recovery steam generator and used in the low pressure turbine. This use of a heat recovery steam generator decreases the efficiency of the system as opposed to using all the energy to add superheat. Mixing the steam from both sources decreases this efficiency loss, but would require stricter water chemistry controls.

U.S. Pat. No. 6,244,033 to Wylie uses the exhaust from a natural gas fired gas turbine unit to directly superheat the steam from a nuclear steam generator. It also makes use of the exhaust gases to preheat the feedwater and provides a supplemental fire unit to ensure there is sufficient energy to provide the superheat and preheat. Notable in this patent is that it specifies that superheat and preheat can be added by the use of additional natural gas heat addition alone if the gas turbine unit is not in operation. There is no provision for the use of coal in this patent, only more expensive natural gas.

SUMMARY OF THE INVENTION

The present invention, in a preferred embodiment, takes the saturated steam output from a nuclear power plant and passes it through a modified coal-fired plant boiler, and then the superheated steam output of the coal plant is sent to the turbines where the energy is extracted and converted to electricity. The nuclear power plant would be only minimally changed from existing designs, the only design revision would be to increase the size of the steam generators by about 15% relative to the size of the reactor core, as the feed water would be preheated to about 450° F. prior to entering the steam generator, so that the heat from the reactor would be used nearly exclusively in converting the water to steam rather than both heating the water and converting it to steam. In an alternative embodiment, a biomass-fueled power plant takes the place of the nuclear power plant to provide steam to the modified coal-fired plant.

While this patent is applicable to any coal fired furnace, a pulverized coal design is described here to show utility of this invention. The coal-fired unit would be more significantly modified, as the steam boiler section (the middle temperature section of the current design) would be eliminated. The superheat tube section of the unit would be greatly expanded to accept the saturated steam from the reactor and raise its temperature greatly before sending the superheated steam off to the turbines. In the firebox, the tubes passing through effluent gasses above 800° F. would be used to superheat the reactor-produced steam, while the tubes in the area where effluent gasses are below 800° F. would be used to pre-heat feedwater. Assuming that the maximum temperature in the firebox is about 2000° F., about 75% of the heat would go to superheating the 575° F. saturated steam to 1200° F. superheated steam, while the remaining 25% would go towards preheating the feedwater prior to entry into the reactor. This would result in a coal-fired plant at one-half of its original size and one-fourth of its original carbon dioxide emissions for the same electrical output. We have built our economic models around the assumption that the optimum solution will be to build the firebox to operate at around 2000° F., and use normal materials in the design of the superheat tubes. We recognize that there is an alternative approach of using more exotic, higher cost materials in the manufacture of the tubes and increasing operating efficiency through higher temperatures to offset the higher material costs. We intend this patent to cover both approaches.

When the nuclear side is taken into consideration, the electricity produced for any given reactor size would increase to at least 3 times its standalone output. This would be a result of the 15% increase in saturated steam generated as a result of the additional preheating of the feedwater in the economizer of the combustible plant as well as the addition of superheat from coal. The superheating of the steam in the coal-fired unit would add 316 recoverable BTUs to the 181 that existed when the steam left the nuclear plant, for a 175% increase. The sum of the 115% saturated steam volume times the 275% superheat addition results in 3.16 times the power output. Another factor is that turbines utilizing superheated steam are more efficient than those that operate with saturated steam, so that a further increase in power output should be obtainable.

Nuclear power plants have historically been built with multiple units at single sites. Of the 63 active sites of nuclear power stations in the United States, 37 have or had either two or three reactors while only 26 were built as single reactor sites. In Canada, there are two sites with four active reactors (each planned for eight) along with one site with two reactors and a single isolated site with one power plant. Most plants are built in close proximity a lake or river to provide a cooling source for the condensers. There would also need to be rail access to provide an economical means of providing the supply of coal for the fossil fueled portion of the plant. These needs are not restrictive as most rail lines follow river beds to avoid significant grades.

Similar benefits can be achieved in biomass fueled power plants, with an additional 194 BTUs of recoverable energy per pound of feedwater. This would be combined with higher efficiency steam turbines to give an efficiency increase of over 55%. In addition, this design would require less biomass for the generation of the same amount of electricity, allowing more of these power plants to be placed into service for a given fuel source.

BRIEF DESCRIPTION OF THE DRAWINGS

FIG. 5 is a table of statistics comparing annual power output, annual costs and annual emissions of two standalone nuclear reactors and a standalone coal-fired plant versus a hybrid power plant of the present invention wherein the two nuclear plants have been interconnected to the coal-fired plant according to the present invention.

DESCRIPTION OF THE INVENTION

Example 1

Schematic of the Hybrid Power Plant

Figure 1A:
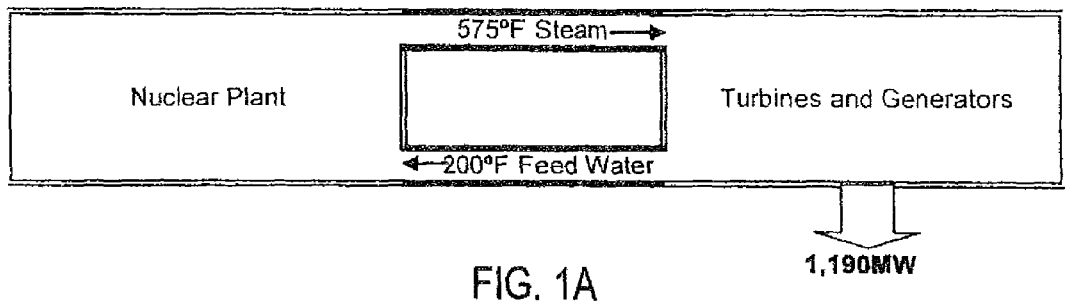
FIG. 1a is a schematic diagram showing the feedwater and steam temperatures of an exemplary standalone nuclear reactor.
Figure 1B:
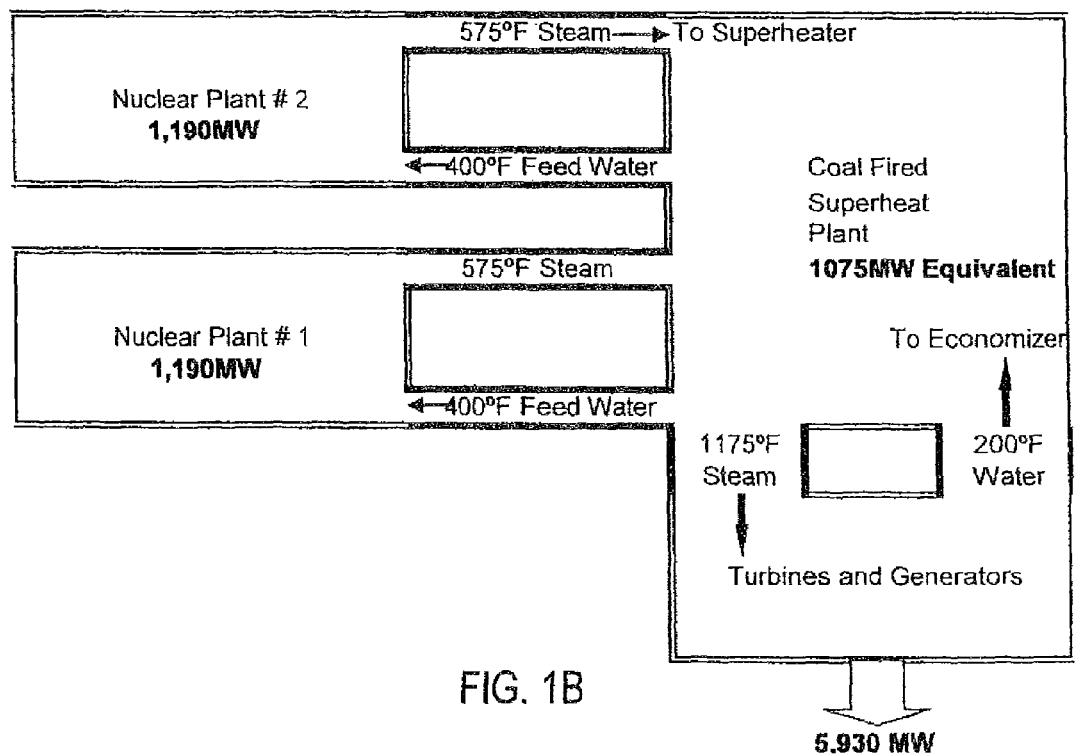
FIG. 1b is a schematic diagram of a hybrid power plant of the present invention wherein the reactor of FIG. 1a has been combined with a coal-fired plant.
Figure 2A:
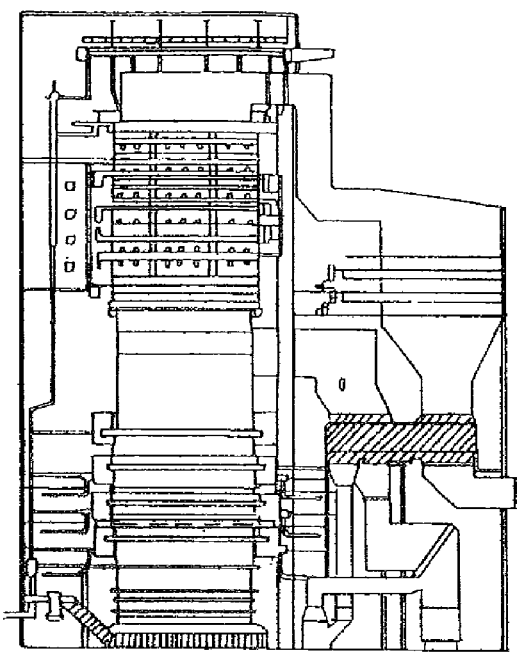
FIG. 2a is a schematic diagram of the principal elements of an exemplary standalone coal-fired power plant.
Figure 2B:
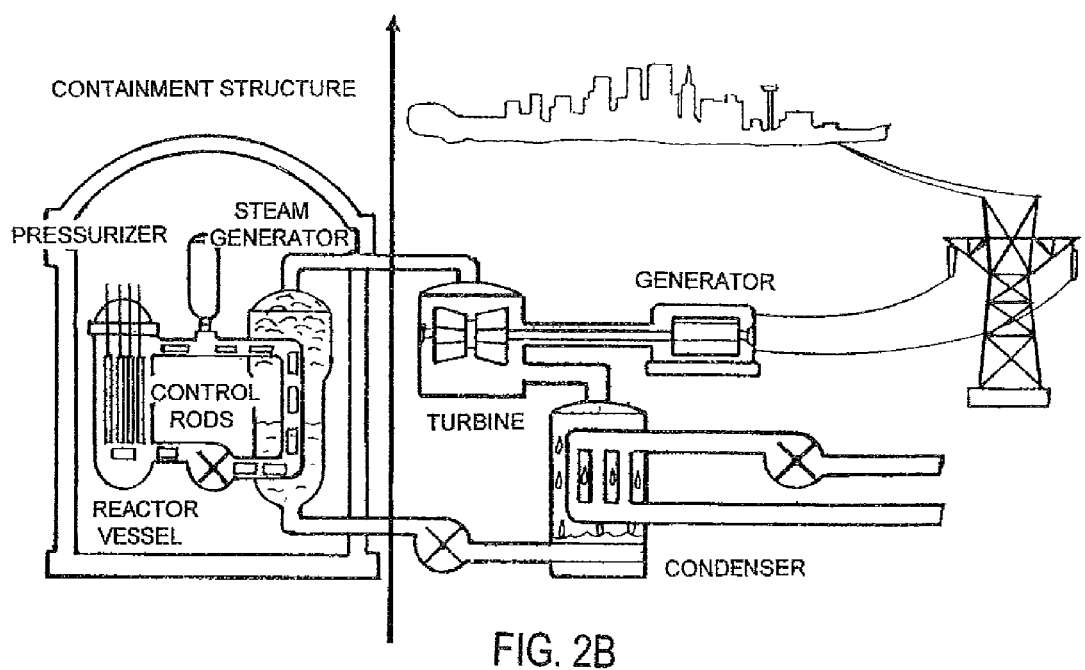
FIG. 2b is a schematic diagram of the principal elements of an exemplary standalone nuclear power plant.
Figure 3:
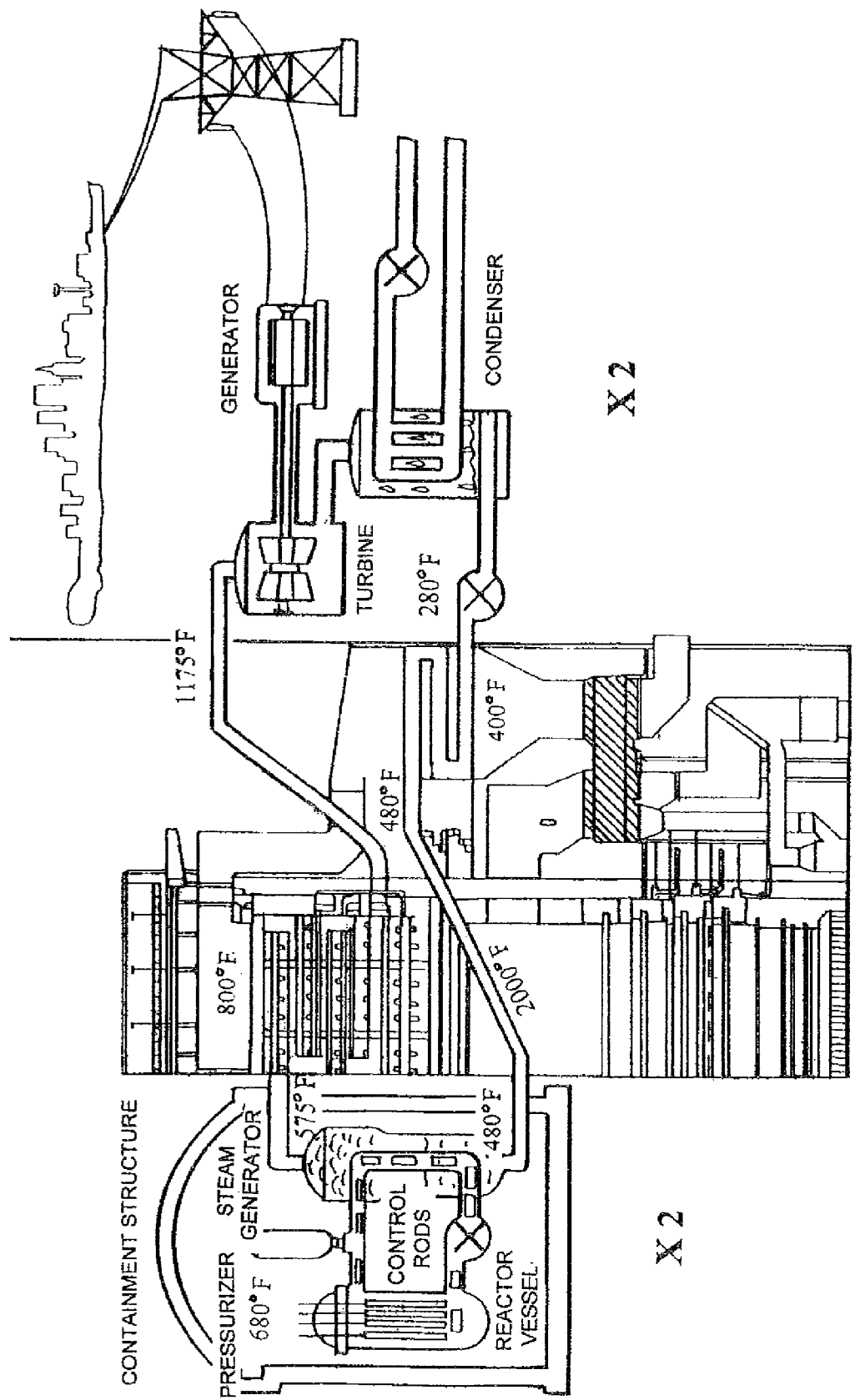
FIG. 3 is a schematic diagram corresponding to FIG. 2, wherein the power plants have been modified and interconnected to form a hybrid power plant of the present invention.

In this example, a standalone pressurized water nuclear reactor (FIGS. 1a and 2a) is interconnected with a standalone coal-fired power plant with the boiling section replaced by an extended superheater (FIG. 2b), forming the hybrid power plant depicted in FIG. 1b and FIG. 3.

Example 2

Rough Estimate of Cost and Emissions Reductions

Figure 4:
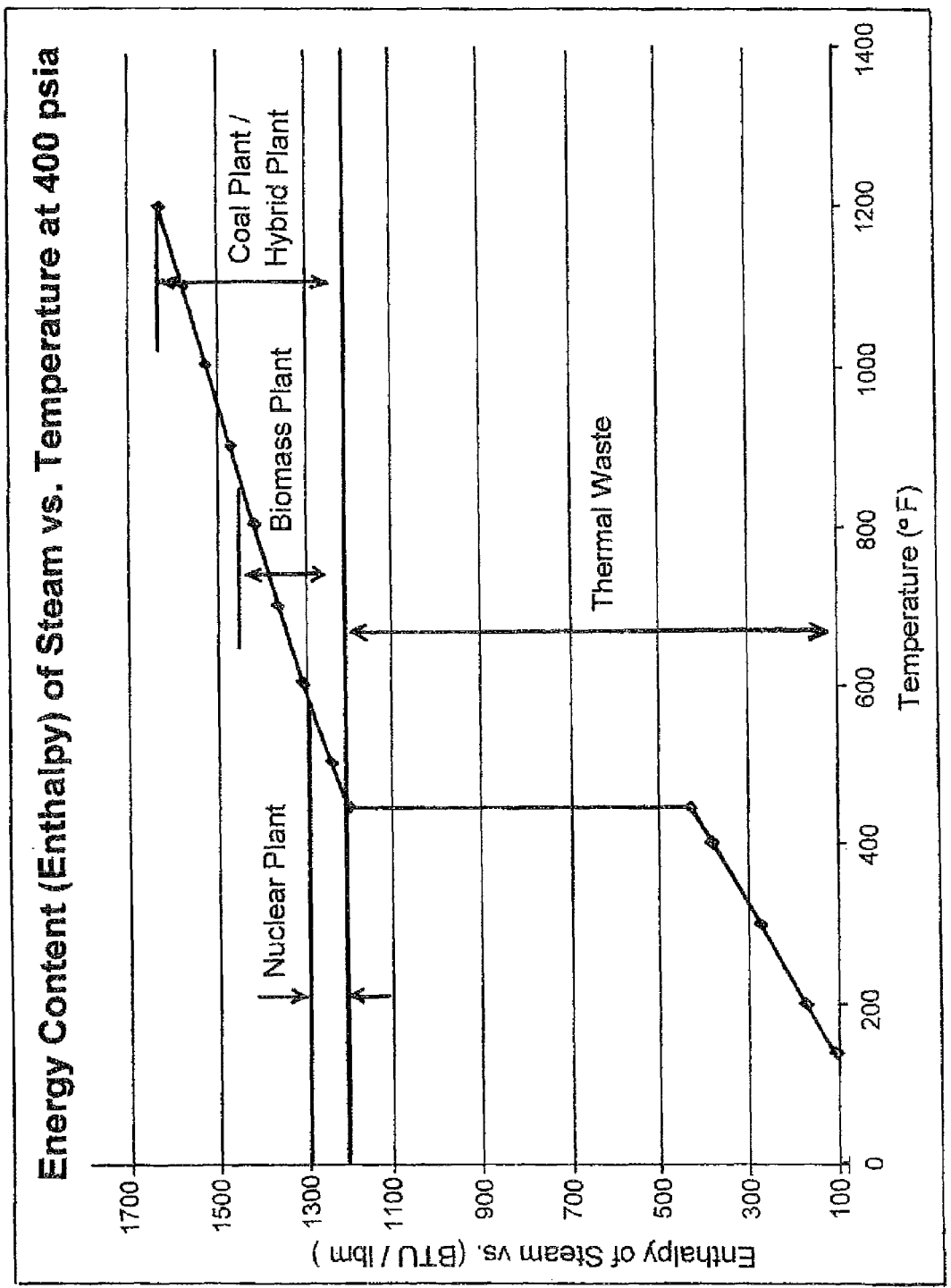
FIG. 4 is a chart of the energy content of the steam for the power plant described in this work. The enthalpy values are shown for 400 psi; energy content is increased further with the use of higher pressure systems. This figure shows the additional usable energy that can be extracted from the steam using the present invention.

A rough estimate of the cost and emissions savings can be done by examining the addition of a coal furnace to two existing nuclear power plants. Consider two 1,190 MW nuclear power plants that are interconnected to a coal-fired power plant sized to provide 1,075 MW if it had been designed as a standalone unit. Following the graph of FIG. 4, and the assumptions provided in the figures, the statistics of annual power output, annual costs of operation, and annual emissions are set out in FIG. 5. It can be seen that, when interconnected according to the present invention, these three units, which would have a 3,455 MW capacity if designed and operated as standalone units, would have a capacity of 5,930 MW. This results in a reduction of about 36% in the cost per kilowatt-hour of electricity produced and a reduction in carbon emissions by about 80%.

Example 3

Detailed Estimate of Cost and Emissions Reduction

To show the economic and environmental benefits of this concept, this example builds on existing facilities. For this comparison, a baseline model for a pressurized water reactor power plant was modeled to allow for comparison. Data and operating parameters from the Wolf Creek Nuclear Generating Station [Black & Veatch] are used to develop the model. This comparison can also be extended to a biomass and coal fired facility with appropriate parameters.

The Wolf Creek Nuclear Generating Station used is an 1190 MW power plant in Burlington, Kans. The design is a Westinghouse 4 loop pressurized water reactor (PWR) plant. Among other details, a moisture separator/reheater and seven closed feedwater heaters are used in the secondary steam system to increase efficiency. The plant operates as a saturated steam Rankine cycle, so there is no superheating of the steam from the steam generators.

During steady state operation, the reactor is used to heat the primary coolant, which in turn is used to heat the secondary coolant, causing it to boil. Circulation in each primary coolant loop is provided by a reactor coolant pump. The saturated steam produced in the steam generator units is delivered via piping to an intermediate-pressure turbine, where some work is produced. After exiting the intermediate-pressure turbine, the steam passes through a moisture separator to dry the steam to prevent turbine damage. The steam is then passed through a low-pressure turbine, where the remainder of the available energy is extracted. A condenser at the outlet of the low-pressure turbine condenses the steam (now called feedwater) so that it can be pumped back to the steam generator using condensate pumps and feed pumps. This condensed steam is passed through seven closed feedwater heaters (CFWH) en route to the steam generator: four between the condensate pumps and feed pumps and three between the feed pumps and the steam generator. These CFWHs are heat exchangers that use steam extracted from different stages of the turbines to preheat the feedwater before it returns to the steam generator. This redirects some of the energy back to the steam generator rather than rejecting it in the condenser, thereby increasing efficiency. The CFWHs before the feed pumps drain to the condenser, while those after the feed pumps drain to a common tank, from which they are returned to the system at the inlet of the feed pumps using a separate drain pump.

Some simplifying assumptions were made in modeling this plant. The system is modeled in a steady state condition. Condenser pressure is assumed to be 1 psia, piping pressure losses of 1% were applied through the system, and a 2% pressure loss across the moisture separator was used. In addition, 15% of the power produced was considered a loss to account for generator losses and power plant parasitic loads, such as cooling water circulation pumps, high-pressure air systems and water treatment facilities. As these assumptions are applied to both power plants, there should be little bias introduced.

Option 1—Hold Electrical Output Constant

Figure 6:
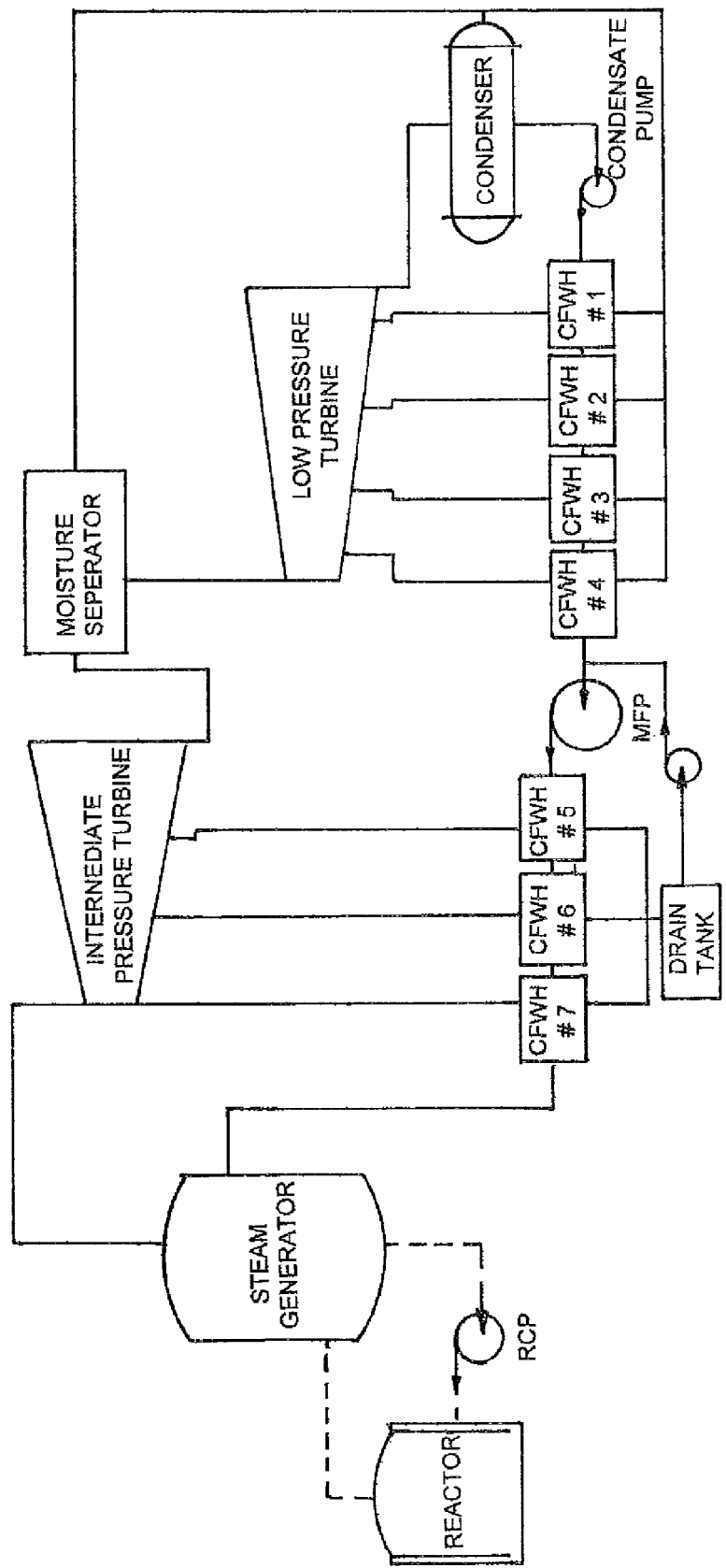
FIG. 6 is a schematic diagram of an exemplary standalone pressurized water nuclear reactor.

Converted to Btus per hour, the electrical output of 1.19 MW is $4.06 \times 10^9$ Btu/hr. To generate this electrical output a reactor power output of $1.375 \times 10^{10}$ Btu/hr is required, which gives a plant efficiency of 29.5%. FIG. 6 gives a schematic diagram of this system. For simplicity only one loop is shown in the figure.

Figure 7:
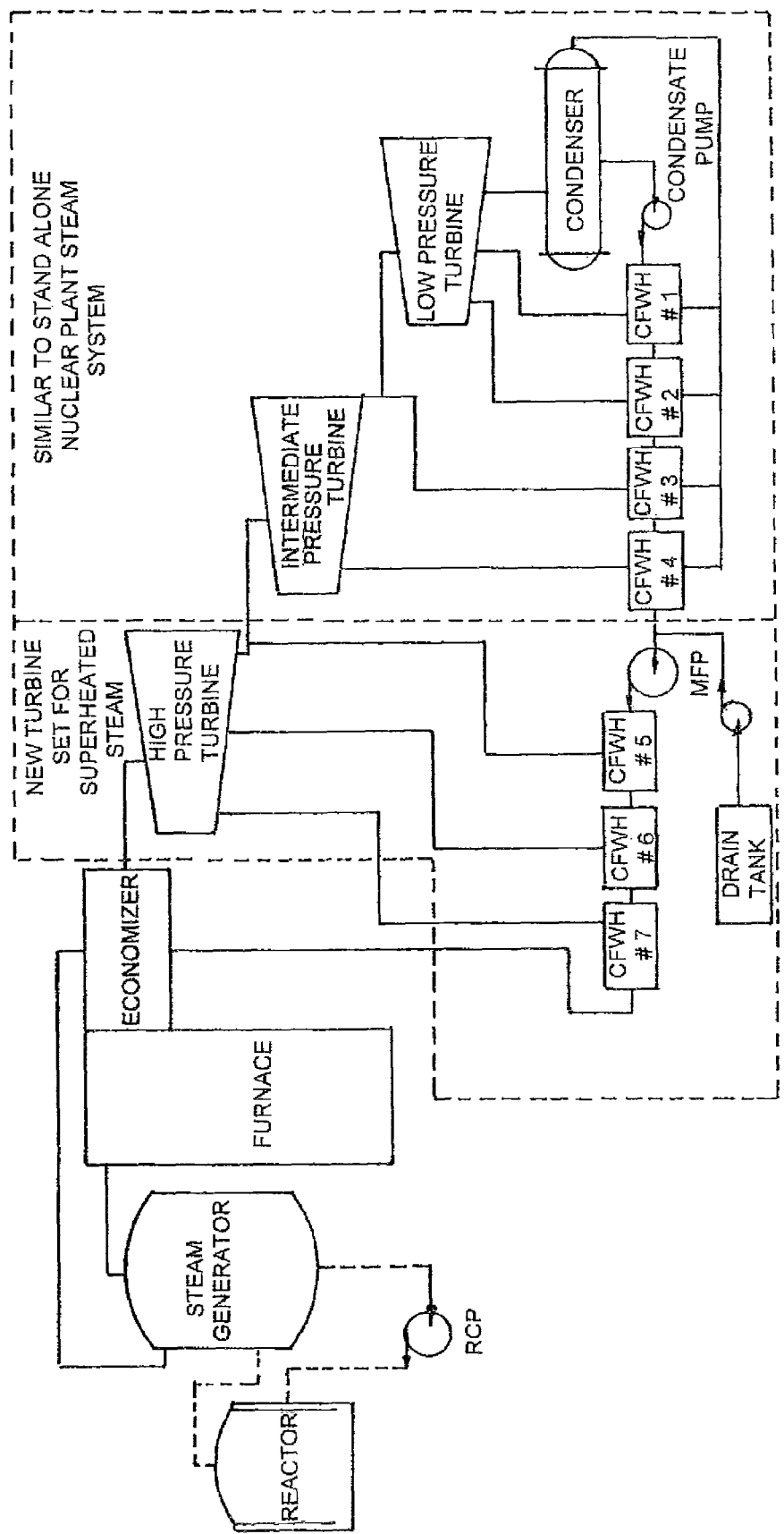
FIG. 7 is a schematic diagram corresponding to FIG. 6 in which the pressurized water reactor has been interconnected to a coal-fired plant in accordance with the present invention.
Figure 8:
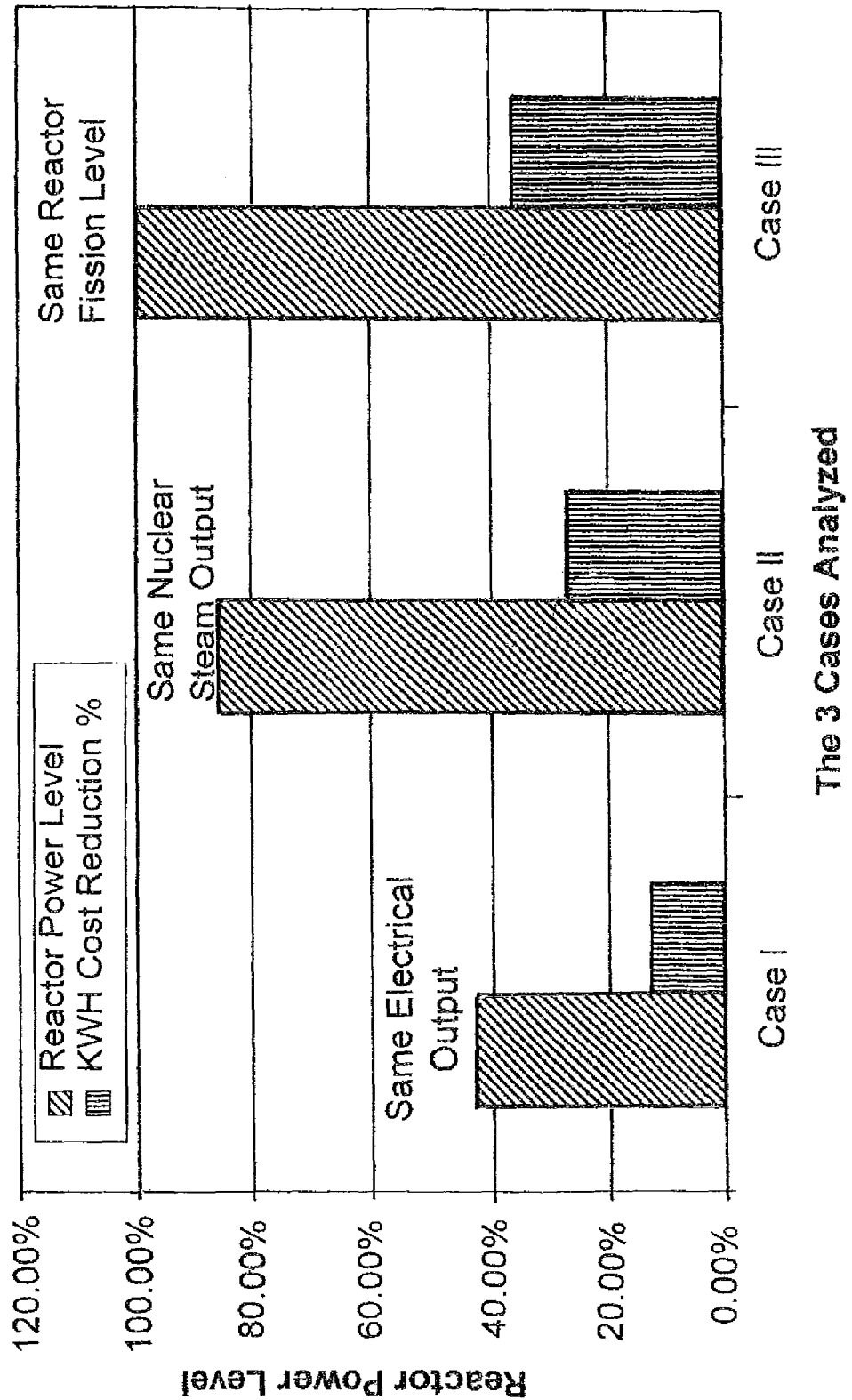
FIG. 8 is a chart that compares the three economic examples presented in this application and shows a surprising consistency in the efficiency improvements inherent in the present invention.

The model of the hybrid facility was developed from the Wolf Creek Generating Station model. The major changes were the insertion of a coal fired furnace to act as a superheater and economizer, and the deletion of the moisture separator unit. The moisture separator is unnecessary as the steam should maintain a sufficient amount of superheat through most of the steam turbines. These changes can be seen in the schematic diagram of the hybrid power plant (FIG. 7).

Some changes also needed to be made in the system parameters to account for the addition of coal energy. The outlet temperature of the superheater is assumed to be 1200° F., which is comparable to modern coal furnace steam outlet temperatures. This added equipment is assumed to cause a 4% pressure decrease in the steam flow due to frictional losses. However, the increase of 600° F. in steam temperature more than makes up for this pressure drop.

The use of the economizer increases the feedwater temperature before it enters the steam generator, decreasing the amount of energy that needs to be added from the primary loop. This heat is added from combustion gases leaving the furnace that are at too low of a temperature to add superheat to the steam, and so this reuse of the energy adds to efficiency. This extra heat addition from both the superheater and the economizer necessitates a change in the operating parameters of the closed feedwater heaters, as the steam delivered to them has a higher heat content and less heat needs to be added. As a result of the economizer and changes to the CFWHs, the feedwater enters the steam generator 80° F. higher than in the traditional PWR plant. A pressure loss of 2% was added in the economizer to take into account the extra energy necessary to pump the feedwater through the heat exchanger piping.

The only change in assumptions for the hybrid plant model from the traditional plant is that three percent more of the electrical energy from the turbines is considered lost. This is a conservative estimate that accounts for the additional parasitic loads, such as induced draft fans, coal mills, and other auxiliary systems associated with the coal fuel system.

To produce the same 1.19 MW of electricity as the traditional design, the hybrid facility required $6.951 \times 10^9$ Btu/hr from the reactor, 50.5% of the power input for the baseline design. An addition of $4.591 \times 10^9$ Btu/hr from coal is also necessary to drive the superheater, for a total heat input of $1.154 \times 10^{10}$ Btu/hr. The plant efficiency for this system is calculated to be 35.5%. Assuming a higher heating value (energy content) of 10,000 Btu/lbm for the coal and a cost of $40 per ton delivered, the cost per kilowatt hour due to coal in a hybrid power facility is $0.00452.

Option II—Hold Reactor Output Constant, Increase Electrical Output

If the primary nuclear plant were left as-is, the rating of the facility would be increased by the addition of the coal-fired superheater. This would increase the output of the plant from the original 1190 MW to 2354 MW. By keeping the size of the reactor plant the same, the capital cost for constructing the plant and the operational costs would remain virtually the same for the reactor systems, increasing electrical production by nearly 98% by adding a coal-fired superheater and additional turbine capacity to accommodate the higher steam flow. Using the same cost assumptions would lead to a cost of $0.01011 per kWhr from the nuclear plant. Again using the previously calculated value of $0.00452 per kWhr for the energy from coal in a hybrid facility, this gives an overall cost of $0.01463 per kWhr. This savings of $0.00537 per kWhr represents a savings of over 25% for electricity production at the power plant while nearly doubling the capacity.

A detailed comparison shows that for the same electricity generation, only 84.7% of the thermal energy input of a traditional design is required for the hybrid facility. In addition, there is 25.8% less heat rejected in the condenser. These values are reflected in the increased plant efficiency.

Example 2

Figure 9:
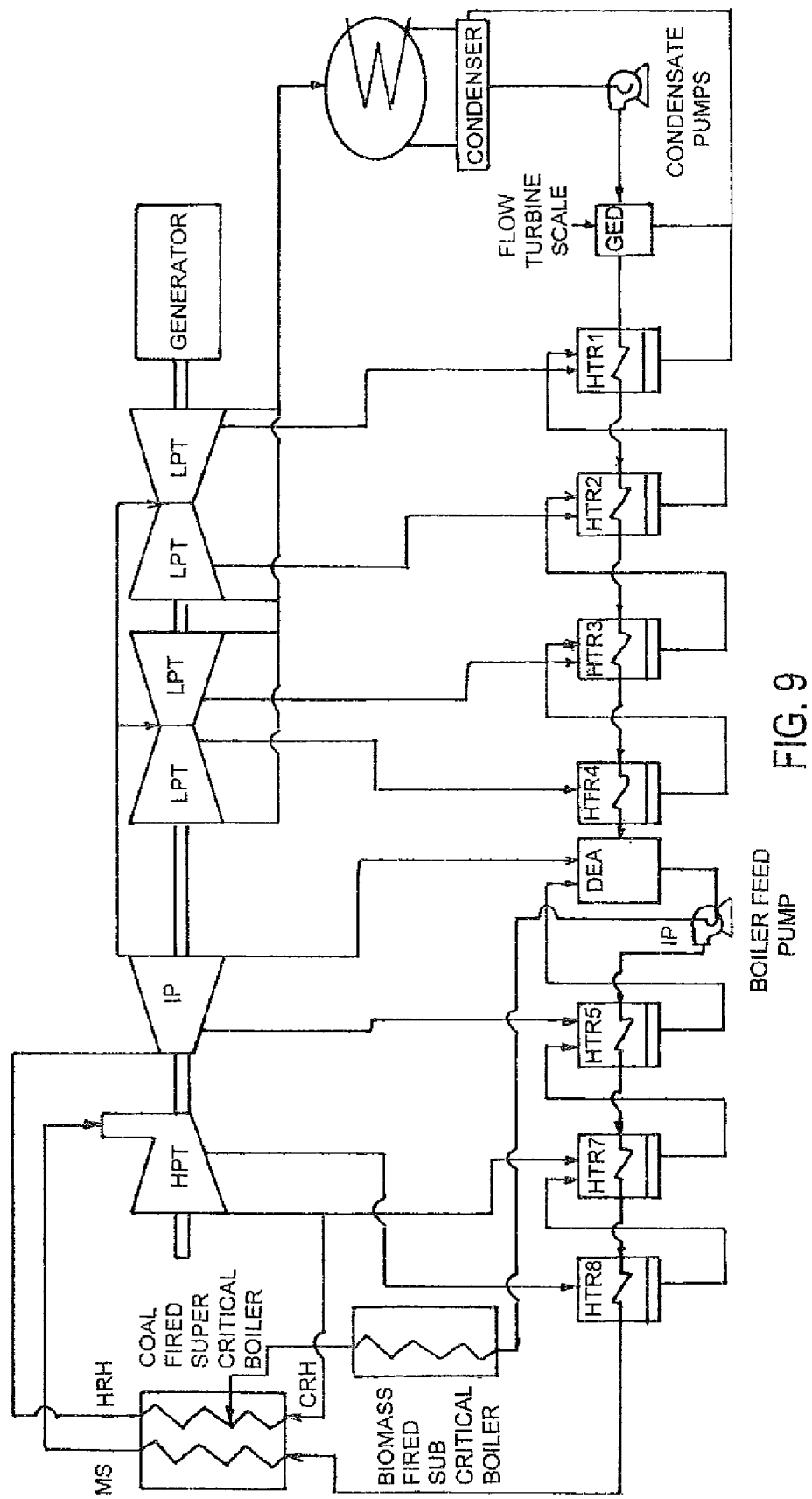
FIG. 9 is a schematic diagram combining a high temperature coal fired supercritical boiler with a biomass fired sub critical boiler to increase the amount of biomass that can be utilized in a high temperature super critical power plant.

Referring to FIG. 9, this hybrid power facility operates by combining a high temperature coal fired supercritical boiler with a biomass fired sub critical boiler to increase the amount of biomass that can be utilized in a high temperature super critical power plant. High pressure and temperature steam is generated in the supercritical coal boiler using a mix of biomass and coal in the furnace section. This steam is routed through a high pressure turbine set where it is used to generate electricity. In generating this electricity, the pressure and temperature of the steam is reduced as the turbine converts the kinetic and thermal energy of the steam to rotational energy that is then converted to electricity in the generator. This lower temperature steam is routed back to the supercritical boiler to add reheat.

A novel design of this example is the introduction of a biomass fired sub critical boiler. This boiler generates steam using only biomass, thereby increasing the overall fraction of biomass that may be used in the power plant. The steam produced in this biomass boiler matches the pressure of the steam exiting the high pressure turbine. This allows the two streams to be mixed either in the reheat section of the super critical boiler or before, increasing the amount of high temperature reheated steam available for energy production. It would also be possible to join the two steam flows after the reheat section, although this would likely result in a lower steam temperature after reheat, removing one of the main benefits of this design. This steam is then expanded through the remainder of the turbine set to produce electricity, condensed, and returned to the boilers to continue the steam cycle. A series of feedwater heaters are used to increase plant efficiency by decreasing the amount of energy necessary to boiler the feedwater.

By using a separate biomass fired boiler, more biomass can be used to generate steam than using a coal fired furnace alone, reducing the carbon emission of the plant while maintaining the increased efficiency of a super critical power plant Conclusions The hybrid facility delivers an efficiency increase to thirty-six percent, an increase of approximately 3% for biomass and 6% for nuclear plants alone. The increase in efficiency is directly related to the higher steam temperature delivered by the coal-fired superheater, increasing the Carnot (or maximum) efficiency that the system can obtain. By using coal to add superheat to the steam, a majority of the energy from the coal is converted to electricity.

As an example, the decreased amount of energy that needs to be added from the reactor system would decrease the cost of the nuclear facility. Decreasing the cost of fuel by 50% (about 15% of the total cost) and using a six-tenths rule for capital, operating, and other costs (the remaining 85%) to decrease them by 33%, the total cost decrease for electrical generation with the nuclear facility is decreased by 35.55%. While this does not include the capital cost of the coal fired furnace, the savings should offset this cost in a short amount of time. While this configuration would have carbon emissions, they would be much lower than a conventional coal facility. Assuming that no superheat was added from the nuclear portion of the plant, the only energy from the coal not converted to electricity would be losses, cutting the carbon emissions by a third. When the increased steam flow due to pre-heating of the feedwater is also taken into account, it would be possible to achieve a carbon reduction of around 75% relative to a stand-alone coal plant.

There is also the potential to add sufficient preheat to the feedwater in the economizer to make the use of feedwater heaters unnecessary. This would reduce the amount of steam flow necessary to produce the same amount of electricity and could possibly increase overall plant output.

The only potential physical limitation to this invention is how to maintain a furnace temperature that is sufficient to add superheat to the steam without damaging the superheater tubes. This should be possible by controlling the amount of oxygen introduced to the fuel during combustion or by fuel selection.

The proposed design results in both a higher plant efficiency and a lower cost per kWhr to produce electricity. Taking all of these factors into account, the models presented here show that the performance benefit of using a combination of biomass or nuclear power to produce steam and coal energy to add superheat has the potential to be economically viable as well as significantly more efficient.

While the foregoing examples have been limited to a combination of nuclear power or biomass plants with coal-fired power plants, the invention also includes a hybrid power plant where a pressurized water reactor is combined with a pebble bed reactor. As with the coal-fired embodiment, the steam from the pressurized water reactor is used as a preheated source of steam for the pebble bed reactor to realize increased efficiencies.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A hybrid power facility operating a single thermodynamic cycle, comprising:
   (a) a biomass- or solar-powered power facility including a subcritical boiler that uses a renewable source of energy to generate saturated steam of a first temperature;
   (b) a power facility including a supercritical boiler that uses fossil fuel to heat the supercritical boiler that has an operating temperature higher than the temperature of said first temperature steam produced in said subcritical boiler;
   (c) a turbine; and
   (d) conduits interconnecting the power facilities, wherein the fossil fuel power facility superheats the saturated steam produced in the subcritical boiler prior to entering the turbine.

2. A method of reducing emissions per unit of power generated in power facilities operating a single thermodynamic cycle, comprising the steps of:
   (a) operating a power facility that uses biomass or solar energy to generate in a subcritical boiler saturated steam of a first temperature;
   (b) operating a power facility that uses fossil fuel to heat a supercritical boiler that has an operating temperature higher than the temperature of said first temperature steam produced in said subcritical boiler;
   (c) operating a turbine; and
   (d) interconnecting the power facilities so the fossil fuel power facility superheats the saturated steam produced in the subcritical boiler prior to entering the turbine whereby the emissions per unit of power generated by the interconnected facilities is less than that of the stand-alone facilities.

3. A method of reducing the cost per unit of power generated in power facilities operating a single thermodynamic cycle, comprising the steps of:
   (a) operating a power facility that uses a renewable source of energy to generate in a subcritical boiler saturated steam of a first temperature;
   (b) operating a power facility that uses fossil fuel to heat a supercritical boiler that has an operating temperature higher than the temperature of said first temperature steam produced in subcritical first boiler;
   (c) operating a turbine; and
   (d) interconnecting the power facilities so the fossil fuel power facility superheats the saturated steam produced in the subcritical boiler prior to entering the turbine whereby the cost per unit of power generated by the interconnected facilities is less than that of the stand-alone facilities.

4. The method of claim 3, wherein the renewable source of energy is selected from geothermal, biomass, and solar-thermal.

* * * * *